Patented Sept. 22, 1925.

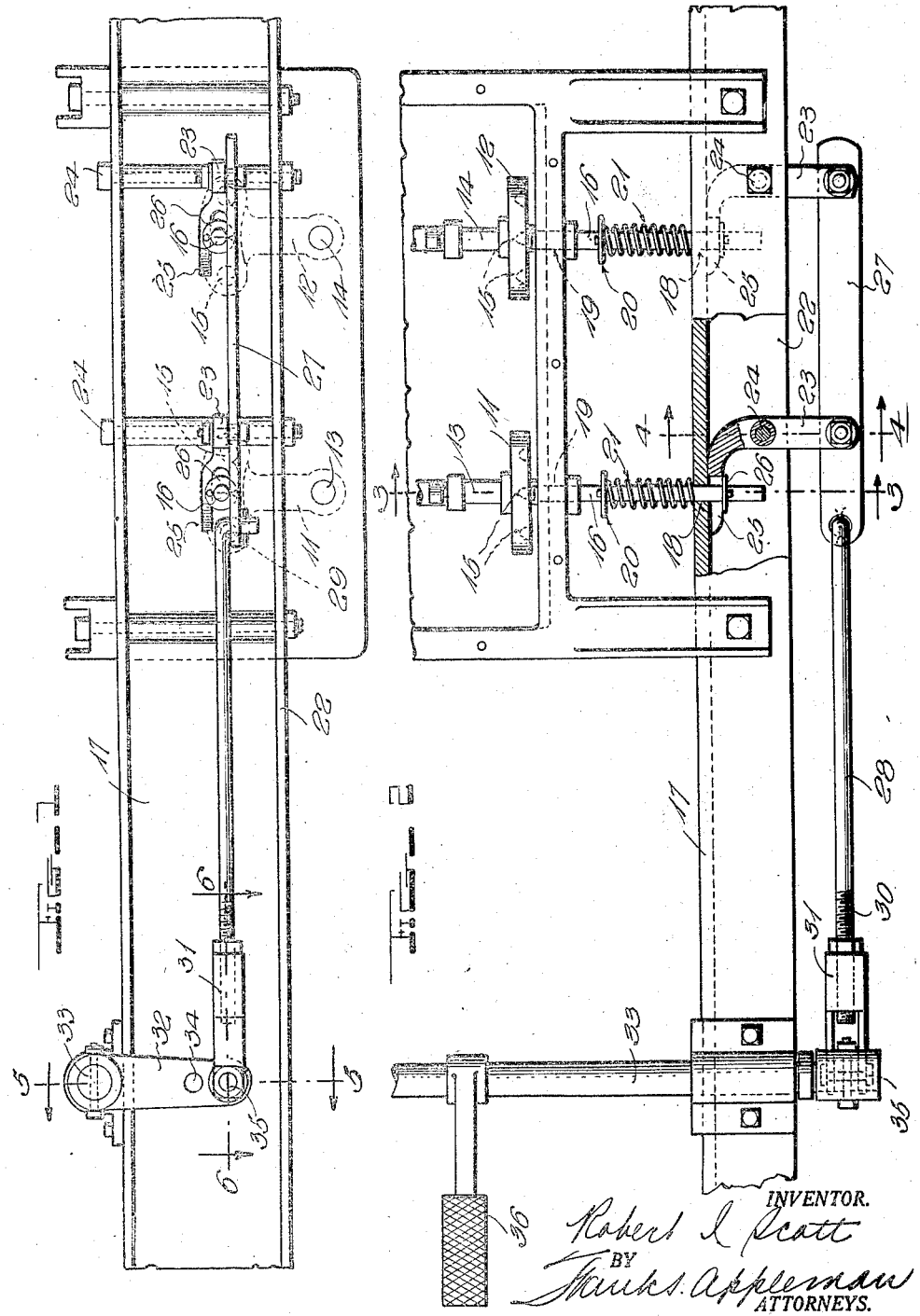

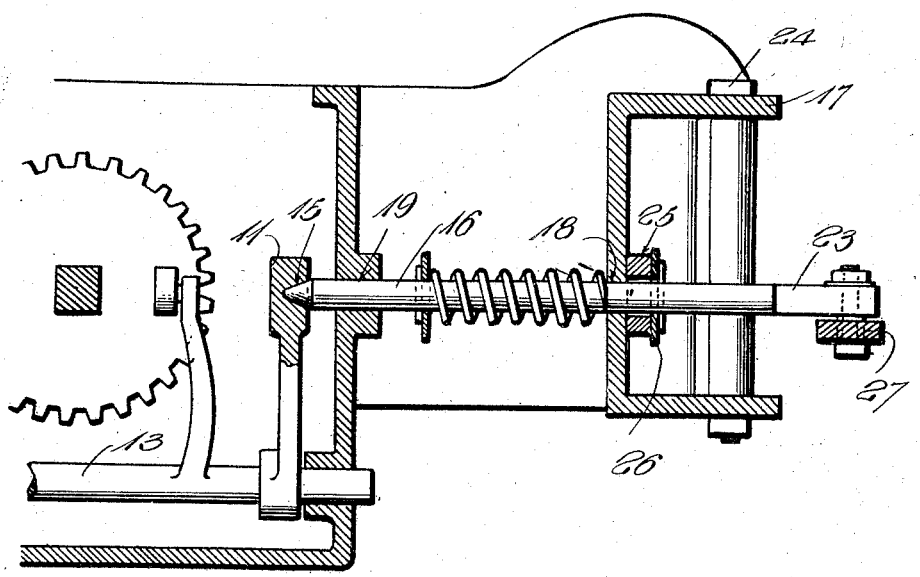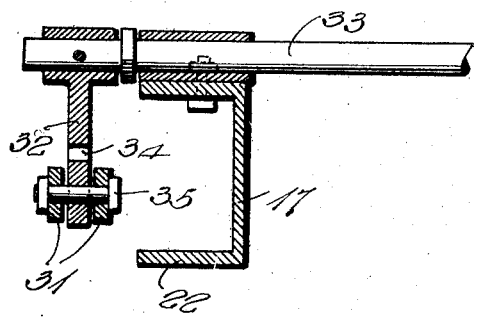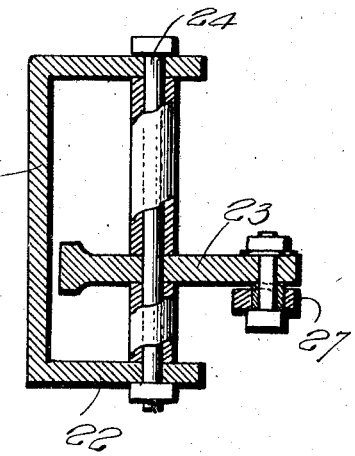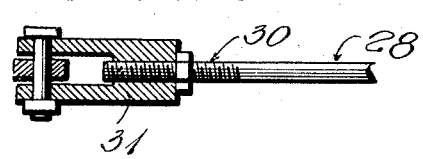

1,554,601

UNITED STATES PATENT OFFICE.

ROBERT I. SCOTT, OF LINCOLN, NEBRASKA.

GEAR LOCK.

Application filed February 24, 1925. Serial No. 11,277.

*To all whom it may concern:*

Be it known that I, ROBERT I. SCOTT, a citizen of the United States of America, and resident of Lincoln, in the county of Lancaster and State of Nebraska, have invented certain new and useful Improvements in Gear Locks, of which the following is a specification.

This invention relates to automobiles and particularly to a device for retaining the transmission gearing in different positions of adjustment and when the gears are in mesh.

It is an object of this invention to produce a safety device effective to retain the gear wheels of the transmission in engagement and against accidental disengagement for the purpose of preventing accidents on steep grades or the like, when it is desirable to maintain a connection between the motor of an automobile and the differential thereof, for the purpose of having the motor aid the brakes in retarding the descent of an automobile on such grades.

It is well known that numerous accidents have occurred due to automobiles running at excessive speed after gearings of the transmission have become inoperative, due to the slipping of the shifting mechanism by which the transmission gears are thrown into engagement with one another.

It is an object furthermore of this invention to produce a gear lock or retaining device which automatically operates to engage parts of the mechanism for holding the gear shift; and it is furthermore an object of this invention to produce novel means whereby the locking mechanism or retaining device is operated to release the shifting device.

It is a still further object of this invention to produce a transmission detent or engaging device which may be applied to transmission casings and mechanisms now in common use by the simple and inexpensive installations.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of the end of a gear case showing a device embodying the invention applied thereto;

Figure 2 illustrates a plan view of a fragment of a gear case with the cover removed and a device embodying the invention installed thereon;

Figure 3 illustrates a sectional view of the device on the line 3—3 of Fig. 2;

Figure 4 illustrates a sectional view of the device on the line 4—4 of Fig. 2;

Figure 5 illustrates a sectional view of the device on the line 5—5 of Fig. 1; and Figure 6 illustrates a sectional view of fragments of the operating means.

In these drawings 10 denotes a gear casing having therein clutch shifting forks 11 and 12 of conventional type that are mounted on shafts 13 and 14 respectively.

Each said shifting fork has recesses or seats such as 15 formed in its outer face and the seats of the different forks are intended to receive a locking pin such as 16, it being understood that one such pin is provided for each fork. A rail 17 may be secured to or from a part of the gear casing, and the said rail has apertures 18 in which the pins 16 are slidable, and the wall of the gear casing has apertures 19 through which the said pins extend into the casing for engaging the forks.

Each pin 16 has a flange 20 forming a shoulder engaged by a spring 21 and the said spring encircles the locking pin between the said shoulder and the rail 17. The spring is under compression and tends to force the locking pin 16 inwardly to seat in one of the recesses 15 of a shifting fork.

The rail has a flange 22 and levers 23 are oscillatably mounted on pivots 24 that are anchored to the said flange. Each lever has an angularly disposed slotted end 25 through which a locking pin projects, and each pin has a shoulder or abutment 26 engaged by the angularly disposed end of a lever in order that when the lever is oscillated from the position shown in Fig. 2, it will retract a locking pin and disengage it from a shifting fork, whereas the said pin will be forced into engagement with the said fork as the lever is returning to its position, as shown in Fig. 2.

The means just described for locking the shifting forks are withdrawn from engagement with them when the levers 23 are oscillated, and the levers are oscillated to release the forks only when the clutch is operated to disengage the clutch members, as this is a desirable arrangement, since the shifting forks should be free to move when gears are to be changed and the gears should only be changed, of course, when the clutch members are disengaged.

In this embodiment of the invention, the levers 23 are pivotally connected to a plate or member 27 to which a thrust motion is imparted by a rod 28 having one end connected to the plate or member 27, through the aperture 29 therein, and the said rod has a threaded end 30 that is adjustable in a coupling 31, which coupling is pivotally connected to the crank arm 32 on the clutch shaft 33. The crank arm may have apertures 34 to receive a pivot 35 in order that the throw of the crank arm and the motion communicated to the rod 28 may be changed to suit particular requirements. The clutch shaft 33 may have the usual pedal 36, pressure on which will partially rotate the clutch shaft to release or disconnect the clutch elements when the gears are to be shifted.

From an inspection of the drawing, therefore, it will be apparent that when the shifting forks are locked by the pins, the gears will be held against movement thereby, and when the gears are to be shifted and the clutch is operated, the shifting forks will be released for manipulation in order that the gears may be shifted to neutral, low or high.

I claim:

1. In a gear lock, a casing having gear shifting elements, each of said elements having seats therein, pins slidably mounted in the wall of the gear case to project therethrough and enter the seats of the shifting elements, levers pivotally mounted externally of the case, the said levers each having an angularly disposed slotted end, the slots of which receive the pins, means for communicating the motion of the levers to the pins, means for urging the pins normally inwardly, a clutch operating device, and means for communicating the motion of the clutch operating device to the levers.

2. In a gear lock, a casing having gear shifting elements, each of said elements having seats therein, pins slidably mounted in the wall of the gear case to project therethrough and enter the seats of the shifting elements, levers pivotally mounted externally of the case, the said levers each having an angularly disposed slotted end, the slots of which receive the pins, means for communicating the motion of the levers to the pins, means for urging the pins normally inwardly, a member pivotally connected to the two levers at the ends remote from the angularly disposed ends, a clutch operating device for an automobile, and means for communicating the motion of the clutch operating device to the said member.

3. In a lock for transmission gears, a casing having shifting forks therein provided with recesses, pins slidably mounted in the wall of the gear case and projecting into the said recesses, springs encircling the locking pins and operative to force the pins normally inwardly, levers oscillatably mounted in operative relation to the pins and having angularly disposed ends with slots to receive the said pins, elements carried by the pins engaged by the levers for retracting the locking pins, a member pivotally connected to the levers at the ends remote from the angularly disposed ends, a clutch operating mechanism for an automobile, and means for communicating the motion of the clutch operating mechanism to the said member connecting the levers.

ROBERT I. SCOTT.